(12) United States Patent
Tao et al.

(10) Patent No.: US 12,307,802 B2
(45) Date of Patent: May 20, 2025

(54) LIGHT WEIGHT MULTI-BRANCH AND MULTI-SCALE PERSON RE-IDENTIFICATION

(71) Applicant: Intel Corporation, Santa Clara, CA (US)

(72) Inventors: Hongzhi Tao, Beijing (CN); Qiang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 270 days.

(21) Appl. No.: 17/764,100

(22) PCT Filed: Dec. 20, 2019

(86) PCT No.: PCT/CN2019/126906
§ 371 (c)(1),
(2) Date: Mar. 25, 2022

(87) PCT Pub. No.: WO2021/120157
PCT Pub. Date: Jun. 24, 2021

(65) Prior Publication Data
US 2022/0351535 A1    Nov. 3, 2022

(51) Int. Cl.
*G06V 40/10* (2022.01)
*G06N 3/04* (2023.01)
(Continued)

(52) U.S. Cl.
CPC ............. *G06V 40/103* (2022.01); *G06N 3/04* (2013.01); *G06V 10/82* (2022.01); *G06V 20/38* (2022.01); *G06V 20/52* (2022.01)

(58) Field of Classification Search
None
See application file for complete search history.

(56) References Cited

U.S. PATENT DOCUMENTS 8,615,105 B1    12/2013 Cheng et al.
9,916,508 B2    3/2018 Pillai et al.
(Continued)

FOREIGN PATENT DOCUMENTS

CN    108108674 A    6/2018
CN    108629801 A    10/2018
(Continued)

OTHER PUBLICATIONS

Chen et al., Spatial-Temporal Attention-Aware Learning for Video-Based Person Re-Identification, IEEE vol. 28, No. 9, Sep. 2019 (Year: 2019).*
(Continued)

*Primary Examiner* — Mark R Milia
(74) *Attorney, Agent, or Firm* — Hanley, Flight & Zimmerman, LLC

(57) ABSTRACT

A system for lightweight multi-branch and multi-scale (LMBMS) re-identification is described herein. The system includes a convolutional neural network trained for person identification, wherein the convolutional neural network comprises a series of residual blocks that obtain input from a head network of the convolutional neural network. The system also includes a plurality of refine blocks, wherein one or more refine blocks take as input features from a residual block of the series of residual blocks, wherein the features are at input at different scales and different resolutions and an output of the plurality of refine blocks is a plurality of features in a same feature space. A channel-wise attention mechanism may merge the plurality of features and generate final dynamic features.

20 Claims, 10 Drawing Sheets

(51) Int. Cl.
*G06V 10/82* (2022.01)
*G06V 20/00* (2022.01)
*G06V 20/52* (2022.01)

(56) References Cited

U.S. PATENT DOCUMENTS

| | | |
|---|---|---|
| 9,948,902 B1 | 4/2018 | Trundle |
| 10,176,405 B1 | 1/2019 | Zhou et al. |
| 10,304,191 B1 | 5/2019 | Mousavian et al. |
| 10,321,728 B1 | 6/2019 | Koh |
| 10,332,264 B2 | 6/2019 | Schulter et al. |
| 10,402,983 B2 | 9/2019 | Schulter et al. |
| 10,430,966 B2 | 10/2019 | Varadarajan et al. |
| 10,733,441 B2 | 8/2020 | Mousavian et al. |
| 10,839,543 B2 | 11/2020 | Cheng |
| 10,853,970 B1 | 12/2020 | Akbas et al. |
| 11,715,213 B2 | 8/2023 | Leung et al. |
| 12,095,973 B2 | 9/2024 | Bylicka et al. |
| 2013/0322720 A1 | 12/2013 | Hu et al. |
| 2015/0095360 A1 | 4/2015 | Vrcelj et al. |
| 2016/0267331 A1 | 9/2016 | Pillai et al. |
| 2017/0316578 A1 | 11/2017 | Fua |
| 2018/0130215 A1 | 5/2018 | Schulter et al. |
| 2018/0130216 A1 | 5/2018 | Schulter et al. |
| 2018/0173969 A1 | 6/2018 | Pillai et al. |
| 2018/0293445 A1 | 10/2018 | Gao |
| 2018/0350105 A1 | 12/2018 | Taylor |
| 2019/0026917 A1 | 1/2019 | Liao et al. |
| 2019/0066326 A1 | 2/2019 | Tran et al. |
| 2019/0171909 A1 | 6/2019 | Mandal et al. |
| 2019/0220992 A1 | 7/2019 | Li et al. |
| 2019/0278983 A1 | 9/2019 | Iqbal et al. |
| 2019/0340432 A1 | 11/2019 | Mousavian et al. |
| 2019/0371080 A1 | 12/2019 | Sminchisescu |
| 2020/0058137 A1 | 2/2020 | Pujades |
| 2020/0074678 A1 | 3/2020 | Ning et al. |
| 2020/0082180 A1 | 3/2020 | Wang |
| 2020/0126297 A1 | 4/2020 | Tian |
| 2020/0160102 A1 | 5/2020 | Bruna et al. |
| 2020/0193628 A1 | 6/2020 | Chakraborty |
| 2020/0327418 A1 | 10/2020 | Lyons |
| 2020/0364454 A1 | 11/2020 | Mousavian et al. |
| 2020/0372246 A1 | 11/2020 | Chidananda |
| 2020/0401793 A1 | 12/2020 | Leung et al. |
| 2021/0000404 A1 | 1/2021 | Wang |
| 2021/0042520 A1 | 2/2021 | Molin |
| 2021/0097718 A1 | 4/2021 | Fisch |
| 2021/0097759 A1 | 4/2021 | Agrawal |
| 2021/0112238 A1 | 4/2021 | Bylicka et al. |
| 2021/0117648 A1 | 4/2021 | Yang et al. |
| 2021/0192783 A1 | 6/2021 | Huelsdunk |
| 2021/0209797 A1 | 7/2021 | Lee |
| 2021/0350555 A1 | 11/2021 | Fischetti |
| 2021/0366146 A1 | 11/2021 | Khamis et al. |
| 2022/0172429 A1 | 6/2022 | Tong |
| 2022/0343639 A1 | 10/2022 | Li et al. |
| 2022/0351535 A1 | 11/2022 | Tao et al. |
| 2023/0186567 A1 | 6/2023 | Koh |
| 2023/0298204 A1 | 9/2023 | Wang |

FOREIGN PATENT DOCUMENTS

| | | |
|---|---|---|
| CN | 108830139 A | 11/2018 |
| CN | 108960036 A | 12/2018 |
| CN | 108986197 A | 12/2018 |
| CN | 109886090 | 6/2019 |
| CN | 109948587 | 6/2019 |
| CN | 110008913 A | 7/2019 |
| CN | 110009722 A | 7/2019 |
| CN | 110047101 A | 7/2019 |
| CN | 110458940 A | 11/2019 |
| CN | 110516670 | 11/2019 |
| KR | 2019087258 A | 7/2019 |
| WO | 2019025729 A1 | 2/2019 |
| WO | 2021109118 A1 | 6/2021 |
| WO | 2021120157 A1 | 6/2021 |
| WO | 2021258386 A | 12/2021 |

OTHER PUBLICATIONS

Arbues-Sanguesa et al., Multi-Person tracking by multi-scale detection in Basketball scenarios, arXiv:1907.04637v1, Jul. 10, 2019 (Year: 2019).*
Delannay et al., Detection and Recognition of Sports(wo)men from Multiple Views, IEEE, 2009 (Year: 2009).*
Fu et al., "Delving deep into multiscale pedestrian detection via single scale feature maps." Sensors 18.4 (2018): 1063. https://www.mdpi.com/1424-8220/18/4/1063 (Year: 2018).
Zajdel et al., "Keeping Track of Humans: Have I Seen This Person Before?" ResearchGate, May 2005, 7 pages.
Felzenszwalb et al. "Object Detection with Discriminatively Trained Part Based Models," IEEE Trans on PAMI 2010, 20 pages.
Andriluka et al., "2D Human Pose Estimation: New Benchmark and State of the Art Analysis," Computer Vision Foundation, 2014, 8 pages.
Zhang et al., "Part-based R-CNNs for Fine-grained Category Detection," arXiv:1407.3867v1 [cs.CV], Jul. 15, 2014, 16 pages.
Zheng et al., "Scalable Person Re-identification: A Benchmark," Computer Vision Foundation, 2015, 9 pages.
Schroff et al., "FaceNet: A unified Embedding for Face Recognition and Clustering," arXiv: 1503.03832v3 [cs.cv], Jun. 17, 2015, 10 pages.
Joo et al., "Panoptic Studio: A Massively Multiview System for Social Interaction Capture," Dec. 9, 2016, Retrieved from the Internet: <https://arxiv.org/abs/1612.03153> 14 pages.
Pavlakos et al., "Harvesting Multiple Views for Marker-less 3D Human Pose Annotations," Apr. 16, 2017, Retrieved from the Internet: <https://arxiv.org/abs/1704.04793> 10 pages.
Zhong et al., "Random Erasing Data Augmentation," arXiv:1708.04896v2 [cs.CV], Nov. 16, 2017, 10 pages.
Hermans et al., "In Defense of the Triplet Loss for Person Re-Identification," arXiv:1703.07737v4 [cs.CV], Nov. 21, 2017, 17 pages.
Hu et al., "Squeeze-and-Excitation Networks," Computer Vision Foundation, 2018, 10 pages.
Sun et al., "Beyond Part Models: Person Retrieval with Refined Part Pooling (and A Strong Convolutional Baseline)," arXiv:1711.09349v3 [cs.cv], Jan. 9, 2018, 10 pages.
Zhang et al., "AlignedReID: Surpassing Human-Level Performance in Person Re-Identification," arXiv. 1711.08184v2 [cs.CV], Jan. 31, 2018, 10 pages.
Rhodin et al., "Learning Monocular 3D Human Pose Estimation from Multi-view Images," Mar. 24, 2018, Retrieved from the Internet: <https://arxiv.org/abs/1803.04775>, 10 pages.
Zhong, Z. et al., "Camera Style Adaptation for Person Re-identification", CVPR (2018), pp. 5157-5166.
Ionescu et al., "Human3.6M Dataset," Retrieved from the Internet: http://vision.imar.ro/human3.6m/description.php, 1 page.
Wang et al., "Learning Discriminative Features with Multiple Granularities for Person Re-Identification," arXiv:1804.01438v3 [cs.CV], Aug. 17, 2018, 9 pages.
Wojke et al., "Deep Cosine Metric Learning for Person Re-Identification," arXiv:1812.00442v1 [cs.CV], Dec. 2, 2018, 9 pages.
Intel, "2019 CES: Intel and Alibaba Team on New AI-Powered 3D Athlete Tracking Technology Aimed at the Olympic Games Tokyo 2020," Retrieved from the Internet: [https://newsroom.intel.com/news/intel-alibaba-team-ai-powered-3dathlete-trackingtechnology-olympic-games-tokyo-2020/#gs-xy8m7c], Jan. 7, 2019, 3 pages.
Schwarcz et al., "3D Human Pose Estimation from Deep Multi-View 2D Pose," Feb. 7, 2019, Retrieved from the Internet: <https://arXiv:1902.02841v1> 6 pages.
Sun et al., "Deep High-Resolution Representation Learning for Human pose Estimation," arXiv:1902.09212v1 [cs.CV], Feb. 25, 2019, 12 pages.

(56) References Cited

OTHER PUBLICATIONS

Luo et al., Bag of Tricks and A Strong Baseline for Deep Person Re-identification, arXiv: 1903.070710 [cs.cv], Apr. 19, 2019, 9 pages.

Iskakov et al., "Learnable Triangulation of Human Pose," May 14, 2019, Retrieved from the Internet: <https://arXiv:1905.05754v1> 9 pages.

Dong, J. et al., "Fast and robust multi-person 3D pose estimation from multiple views", Proceedings of the IEEE Conference on Computer Vision and Pattern Recognition; pp. 7792-7801, 2019.

Min Xin et al., "Motion Capture Research: 3D Human Pose Recovery Based on RGB Video Sequences," Applied Sciences, vol. 9, No. 17, Sep. 2, 2019, pp. 1-22, XP55885594, DOI:10.3390/app9173613, 22 pages.

Qiu et al., "Cross View Fusion for 3D Human Pose Estimation," Sep. 3, 2019, Retrieved from the Internet: <https://arxiv.org/abs/1909.01203> 10 pages.

International Searching Authority, "International Search Report," issued in connection with International Patent Application No. PCT/CN2019/123625, mailed on Sep. 9, 2020, 3 pages.

International Searching Authority, "Written Opinion of the International Searching Authority," issued in connection with International Patent Application No. PCT/CN2019/123625, mailed on Sep. 9, 2020, 4 pages.

International Searching Authority, "Written Opinion of the International Searching Authority," issued in connection with International Patent Application No. PCT/CN2019/126906, mailed on Sep. 23, 2020, 3 pages.

International Searching Authority, "International Search Report," issued in connection with International Patent Application No. PCT/CN2019/126906, mailed on Sep. 23, 2020, 3 pages.

International Searching Authority, "International Search Report," issued in connection with International Patent Application No. PCT/CN2020/098306, mailed on Mar. 25, 2021, 5 pages.

International Searching Authority, "Written Opinion of the International Searching Authority," issued in connection with International Patent Application No. PCT/CN2020/098306, mailed on Mar. 25, 2021, 4 pages.

International Searching Authority, "Written Opinion of the International Searching Authority," issued in connection with International Patent Application No. PCT/US2021/050609, mailed on Dec. 28, 2021, 5 pages.

International Searching Authority, "International Search Report," issued in connection with International Patent Application No. PCT/US2021/050609, mailed on Dec. 28, 2021, 5 pages.

International Searching Authority, "International Preliminary Report on Patentability," issued in connection with International Patent Application No. PCT/CN2019/123625, mailed on Jun. 16, 2022, 6 pages.

International Searching Authority, "International Preliminary Report on Patentability," issued in connection with International Patent Application No. PCT/CN2019/126906, mailed on Jun. 30, 2022, 5 pages.

United States Patent and Trademark Office, "Non-Final Office Action," issued in connection with U.S. Appl. No. 16/914,232, dated Jul. 21, 2022, 13 pages.

United States Patent and Trademark Office, "Notice of Allowance and Fee(s) Due," issued in connection with U.S. Appl. No. 16/914,232, dated Nov. 30, 2022, 9 pages.

United States Patent and Trademark Office, "Notice of Allowance and Fee(s) Due," issued in connection with U.S. Appl. No. 16/914,232, dated Dec. 14, 2022, 4 pages.

International Searching Authority, "International Preliminary Report on Patentability," issued in connection with International Patent Application No. PCT/CN2020/098306, mailed on Jan. 5, 2023, 6 pages.

Intel, "Intel True View," https://www.intel.com/content/www/us/en/sports/technology/true-view.html, last accessed Feb. 24, 2023.

United States Patent and Trademark Office, "Notice of Allowance and Fee(s) Due," issued in connection with U.S. Appl. No. 16/914,232, dated Mar. 15, 2023, 8 pages.

United States Patent and Trademark Office, "Notice of Allowance and Fee(s) Due," issued in connection with U.S. Appl. No. 17/131,433, dated May 16, 2024, 6 pages.

International Searching Authority, "International Preliminary Report on Patentability," issued in connection with International Patent Application No. PCT/US2021/050609, mailed on Jul. 6, 2023, 7 pages.

United States Patent and Trademark Office, "Non-Final Office Action," issued in connection with U.S. Appl. No. 17/131,433, dated Feb. 15, 2024, 11 pages.

European Patent Office, "Extended European Search Report," issued in connection with European patent Application No. 20941827.6, dated Feb. 29, 2024, 9 pages.

United States Patent and Trademark Office, "Non-Final Office Action," issued in connection with U.S. Appl. No. 17/764,093, dated Apr. 24, 2024, 28 pages.

United States Patent and Trademark Office, "Advisory Action," issued in connection with U.S. Appl. No. 17/764,093, dated Oct. 15, 2024, 3 pages.

United States Patent and Trademark Office, "Final Office Action," issued in connection with U.S. Appl. No. 18/000,389, dated Oct. 18, 2024, 11 pages.

United States Patent and Trademark Office, "Non-Final Office Action," issued in connection with U.S. Appl. No. 17/764,093, dated Nov. 18, 2024, 36 pages.

Chen, Dapeng, et al. "Video Person Re-identification with Competitive Snippet-Similarity Aggregation and Co-attentive Snippet Embedding." 2018 IEEE/CVF Conference on Computer Vision and Pattern Recognition. IEEE, 2018.https://ieeexplore.ieee.org/abstract/document/8578226 (Year: 2018), 10 pages.

United States Patent and Trademark Office, "Corrected Notice of Allowability," issued in connection with U.S. Appl. No. 17/131,433, dated Jul. 31, 2024, 3 pages.

United States Patent and Trademark Office, "Non-Final Office Action," issued in connection with U.S. Appl. No. 18/000,389, dated Jul. 1, 2024, 18 pages.

United States Patent and Trademark Office, "Final Office Action," issued in connection with U.S. Appl. No. 17/764,093, dated Jul. 15, 2024, 29 pages.

United States Patent and Trademark Office, "Notice of Allowance and Fee(s) Due," issued in connection with U.S. Appl. No. 18/000,389, dated Jan. 15, 2025, 10 pages.

International Searching Authority, "Search Report," issued in connection with International Patent Application No. PCT/CN2019/126906, mailed on Sep. 23, 2020, 4 pages.

International Searching Authority, "Written Opinion," issued in connection with International Patent Application No. PCT/CN2019/126906, mailed on Sep. 23, 2020, 4 pages.

Wang et al., "Person Re-identification with Cascaded Pairwise Convolutions," 2018 IEEE/CVF Conference on Computer Vision and Pattern Recognition, Dec. 31, 2018 (9 pages).

* cited by examiner

100

Camera 20
310

Camera 02
304

Camera 16
308

302

Camera 04
306

300

400

500

600

LIGHT WEIGHT MULTI-BRANCH AND MULTI-SCALE PERSON RE-IDENTIFICATION

RELATED APPLICATION

This patent arises under 35 U.S.C. § 371 from a U.S. National Stage of International Patent Application No. PCT/CN2019/126906, which was filed on Dec. 20, 2019. International Patent Application No. PCT/CN2019/126906 is hereby incorporated herein by reference in its entirety. Priority to International Patent Application No. PCT/CN2019/126906 is hereby claimed.

BACKGROUND

Multiple cameras can be used to capture activity in a scene. Subsequent processing of the captured images enables end users to view the scene and move throughout the scene over a full 360-degree range of motion. For example, multiple cameras may be used to capture a sports game and end users can move throughout the area of play freely. The end user may also view the game from a virtual camera.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2B; and so on.

DESCRIPTION OF THE EMBODIMENTS

Figure 1:
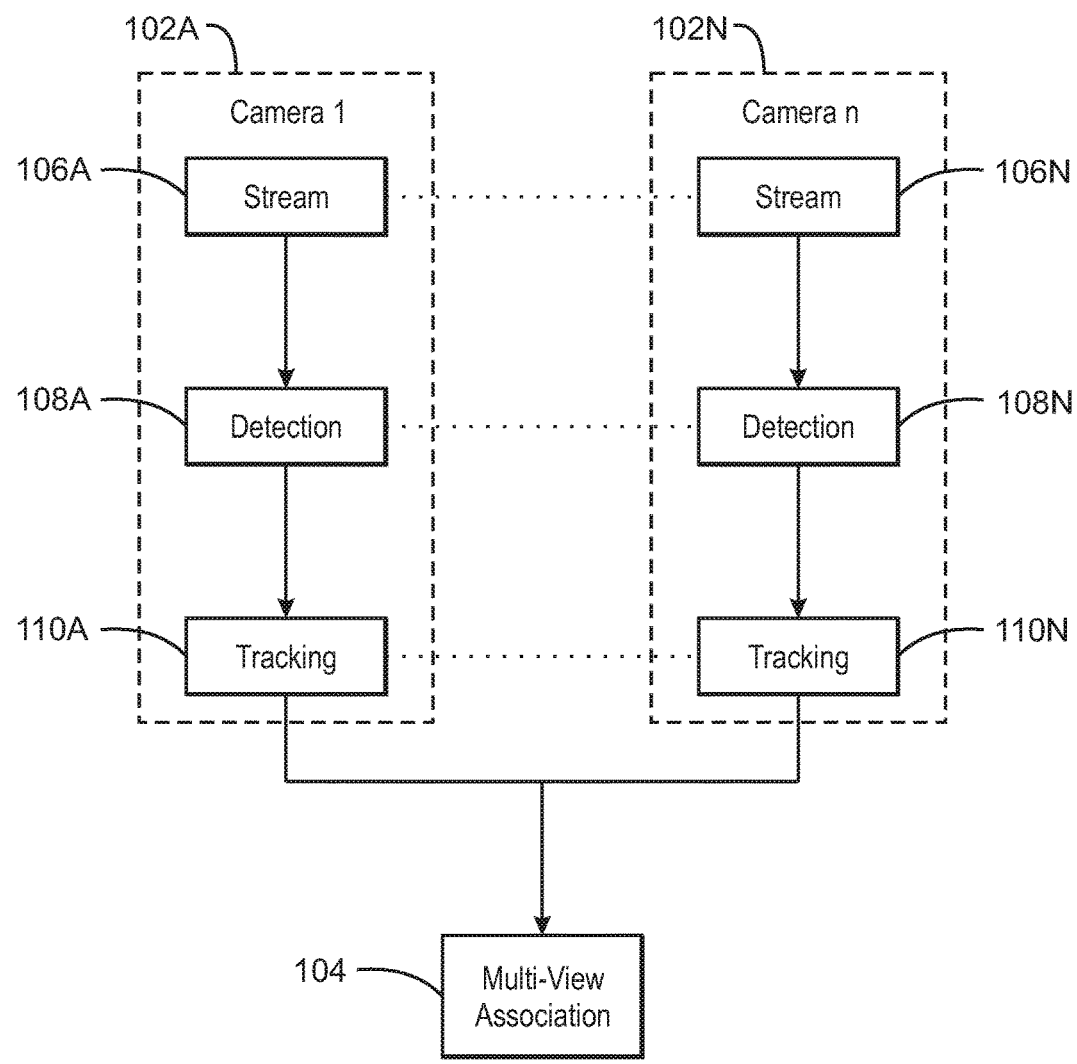
FIG. 1 is a block diagram of a multiple player tracking system.

Sporting events and other competitions are often broadcast for the entertainment of end users. These games may be rendered in a variety of formats. For example, a game can be rendered as a two-dimensional video or a three-dimensional video. The games may be captured using one or more high-resolution cameras positioned around an entire area of play. The plurality of cameras may capture an entire three-dimensional volumetric space, including the area of play. In embodiments, the camera system may include multiple super high-resolution cameras for volumetric capture. The end users can view the action of the game and move through the captured volume freely by being presented with a sequence of images representing the three-dimensional volumetric space. Additionally, an end user can view the game from a virtual camera that follows the action within the area by following the ball or a specific player in the three-dimensional volumetric space. As used herein, the area of play is the portion of space that is officially marked for game play. In examples, the area of play may be a field, court, or other ground used for game play.

Capturing a sporting event using multiple high-resolution cameras creates a three-dimensional (3D) scene for every play in real-time, which brings immersive, interactive experience to end users. To replay exciting moments from any angle, a virtual camera can be controlled to follow a specific path for offering immersive user experience. A core component of controlling a path of the virtual camera is a multiple camera (multi-camera) based multiple player tracking algorithm that is used to track every player within the area of play. In the multiple camera based multiple player tracking, player re-identification (Re-ID) associates a same player across frames captured by the same camera. A multi-camera association component may find the same player across frames from different cameras.

The present techniques enable a lightweight multi-branch and multi-scale (LMBMS) re-identification. A person may be re-identified by determining the correspondences of an identity of a query person across frames captured by the same camera, as well as frames captured from multiple cameras at a same time. Thus, re-identification can be used in single camera person tracking and multi-view association. The present techniques include re-identification that considers local information, employs multi-scale fusion, and generates dynamic features.

The local information may be local features extracted from shallow layers of convolution neural network. A multi-branch structure is built to realize multi-scale fusion in person Re-ID. Additionally, a channel-wise attention mechanism is deployed to generate robust, dynamic features. The LMBMS model according to the present techniques enables a good balance of performance and speed. For ease of description, the present techniques are described using a sporting event as a scene and players as persons that are re-identified. However, the present techniques may apply to any scene with any person or object re-identified.

Person Re-ID is especially challenging when applied to sporting events for several reasons. First, players of the same team wear almost identical jerseys during gameplay. Additionally, extreme interactions where players come into bodily contact with other players are very common in many sports. The extreme interactions and other issues such as like posture, occlusion, etc. are more pronounced in sporting events when compared to existing Re-ID datasets. Traditional solutions focus on unified, abstract, and global information, and as such do not work well in sports applications and thus cannot resolve the aforementioned problems. The light-weight person Re-ID model with multi-branch and multi-scale convolution neural network of the present techniques addresses these challenges. For ease of description, the present techniques are described using basketball. However, the present techniques may apply to any scene and any sport, such as football, soccer, and the like.

FIG. 1 is a block diagram of a multiple player tracking system 100. The multiple player tracking system 100 includes a plurality of single player tracking modules 102 and a multi-view association module 104. In particular, the multiple player tracking system 100 includes single player tracking modules 102A . . . 102N, where there are N cameras and each single player tracking module corresponds to a camera. In embodiments, the camera system may include one or more physical cameras with 5120×3072 resolution, configured to capture the area of play. The number of cameras may be selected to ensure that the entire area of play is captured by at least three cameras. The plurality of cameras captures a real-time video stream at various poses. The plurality of cameras may capture the area of play at 30 frames per second (fps). The number of cameras selected may be different in different scenarios. For example, depending on the structure surrounding the area of play, each location may be captured by at least three cameras using a varying number of cameras.

In embodiments, the multiple-camera based player tracking process decouples the identity of a player from the location of a player. As illustrated, each single player tracking module 102A . . . 102N obtains a respective stream 106A . . . 106N. Each stream may be a video that contains multiple images or frames captured by a camera. For each single player tracking module 102A . . . 102N, a plurality of detection blocks 108A . . . 108N detects a same player in a single camera view. In embodiments, player detection executes on each decoded frame captured by each camera to generate all player positions in a two-dimensional (2D) image. Each player's position may be defined by a bounding box. For each of the detection blocks 108A . . . 108N, isolated bounding boxes are determined that define the location of each player in a stream corresponding to each single camera view. A plurality of tracking blocks 110A . . . 110N track each player detected at blocks 108A . . . 108N in the streams 106A . . . 106N. In embodiments, player tracking is executed via a location-based tracking module. A single camera multiple object tracking algorithm tracks all players for consecutive frames in each camera.

The single camera player tracking results for each camera are input into a multi-view association module 104. Multiple player tracking results can be obtained in 3D space through multi-view association to connect the same player across multiple cameras. The multi-view association module 104 executes at the frame-level to associate players identified in each camera view across all camera views. Accordingly, the multi-view association module 104 uses the bounding boxes of a player at a timestamp t from multiple cameras to derive a location of the player in the area of play. The location may be a two-dimensional or a three-dimensional location in the captured volumetric space. In particular, the multi-view association module 104 associates bounding boxes in multiple camera views of an identical player by Re-ID features from each camera of the camera system.

Put another way, the multi-view association module 104 identifies the same player tracked in each camera view. In embodiments, a 3D position is computed for each player using projection matrices. In examples, a projection matrix is camera parameter. The projection matrix enables the use of image coordinates from multiple cameras to generate corresponding three-dimensional locations. The projection matrix maps the two-dimensional coordinates of a player in from multiple cameras at timestamp t to a three-dimensional location within the three-dimensional volumetric space of the captured scene.

Through the use of images obtained from high resolution cameras, the present techniques are able to immerse an end user in a three-dimensional recreation of a sporting event or game. In embodiments, an end user is able to view gameplay from any point within the area of play. The end user is also able to view a full 360° of the game at any point within the area of play. Thus, in embodiments an end user may experience gameplay from the perspective of any player. The game may be captured via a volumetric capture method. For example, game footage may be recorded using a plurality of 5K ultra-high-definition cameras that capture height, width, and depth of data points to produce voxels (pixels with volume). Thus, a camera system according to the present techniques may include multiple super-high-resolution cameras to capture the entire playing area. After the game content is captured, a substantial amount of data is processed, and all viewpoints of a fully volumetric three-dimensional person or object are recreated. This information may be used to render a virtual environment in a multi-perspective three-dimensional format that enables users to experience a captured scene from any angle and perspective, and can provide a true six degrees of freedom. The ability to progress through the area of play enables an end user to "see" the same view as a player saw during real-time gameplay. The present techniques also enable game storytelling, assistant coaching, coaching, strategizing, player evaluation, and player analysis through the accurate location of players at all times during active gameplay. Re-identification as described herein can be applied to frames from a single camera during single camera tracking. Re-identification may also be applied to frames from multiple cameras at time t. Thus, in a multiple player tracking system, player Re-ID plays an important role in both single camera player tracking and multi-view association.

The diagram of FIG. 1 is not intended to indicate that the example system is to include all of the systems and modules shown in FIG. 1. Rather, the example system 100 can be implemented using fewer or additional camera systems and modules not illustrated in FIG. 1.

Figure 2:
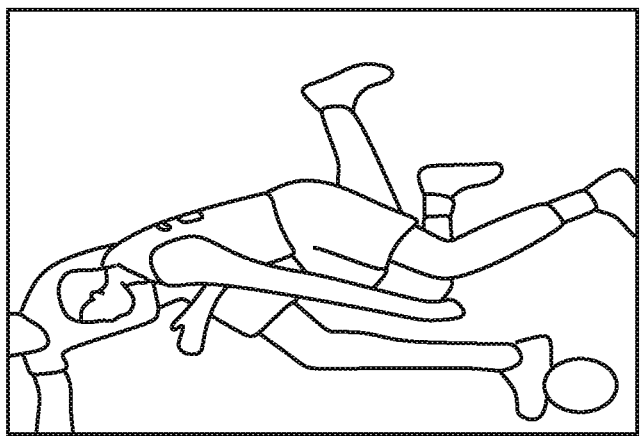
FIG. 2 is an illustration of bounding boxes extracted from frames captured from a single camera view.
Figure 2:
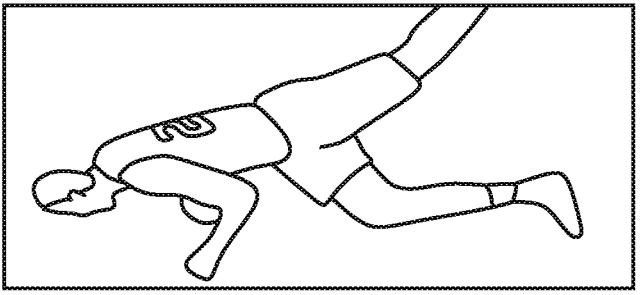
Figure 2:
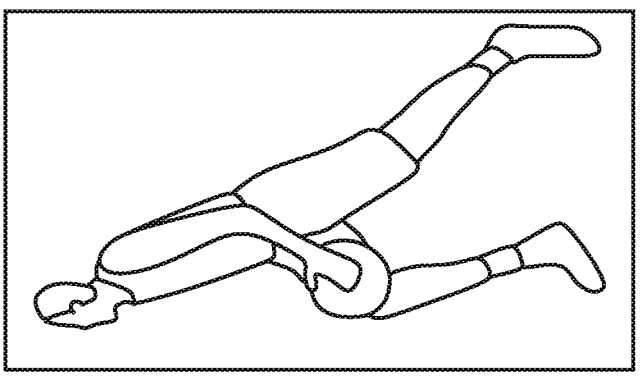
Figure 2:
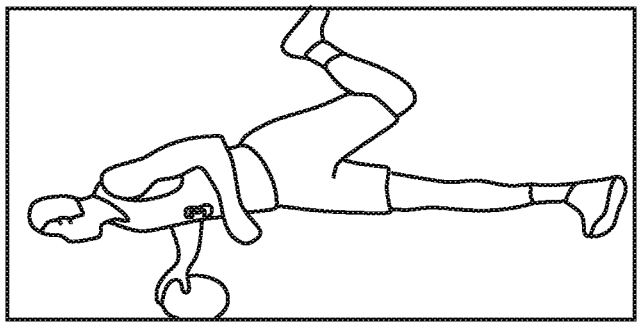

FIG. 2 is an illustration of a plurality of bounding boxes 200 extracted from frames captured by a single camera view. In single camera tracking, Re-ID is used to match a player in pairs between frames captured by the same camera. As illustrated in FIG. 2, a bounding box 202, bounding box 204, bounding box 206, and bounding box 208 are extracted from frames captured by a single camera at various timestamps. For each pair of frames captured by the single camera, all players are detected by determining isolated bounding boxes that define the location of each player and then matching features within the bounding boxes. Re-ID may be used to obtain an association of the bounding boxes of an identical player across frames captured by the single camera. In embodiments, each player is assigned a unique identifier across the frames captured by the single camera.

The diagram of FIG. 2 is not intended to indicate that the frames are limited to capturing a single player. Rather, the bounding boxes are 200 image patches derived from a frame, which can include multiple image patches or bounding boxes. The present techniques can be implemented using any number of bounding boxes not illustrated in FIG. 2.

Figure 3:
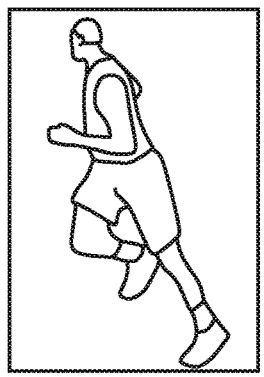
FIG. 3 is an illustration of bounding boxes captured from a multiple camera at a timestamp t.
Figure 3:
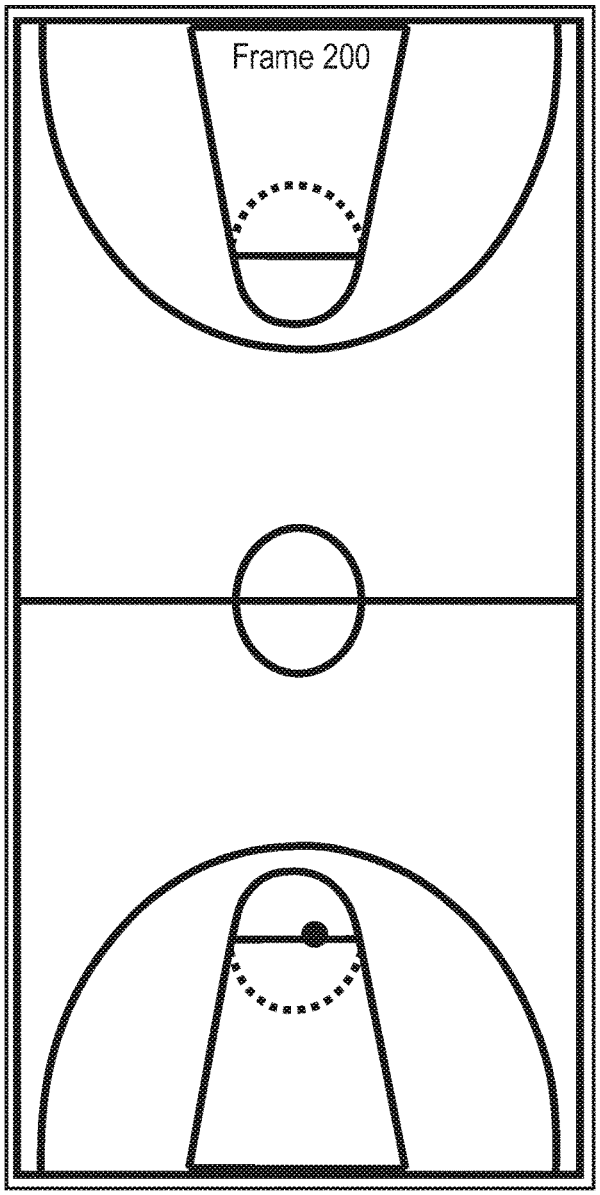
Figure 3:
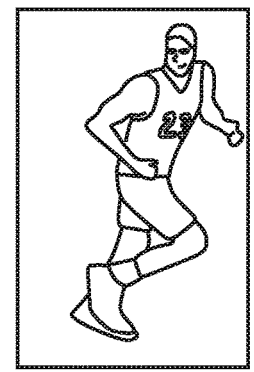
Figure 3:
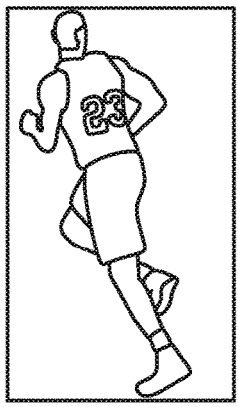
Figure 3:
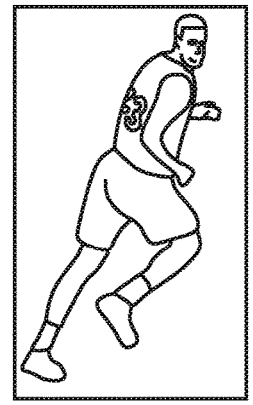

FIG. 3 is an illustration of bounding boxes 300 captured from a multiple camera at a timestamp t. In FIG. 3, an area of play 302 is illustrated. A plurality of cameras is positioned around the area of play 302. In particular, camera 02, camera 04, camera 16, and camera 20 may be used to capture a plurality of players at a timestamp t. The isolated bounding box 304, bounding box 306, bounding box 308, and bounding box 310 are of a same player. These bounding boxes are associated across multiple camera views by matching each player in pairs among all cameras in the same frame at a same timestamp t, illustrated in FIG. 3.

Though the particular usage of player Re-ID in player tracking and multi-view association is different, their underlying philosophy is the same, i.e., determining whether a pair of image patches is the same player from any frames and any cameras. Accordingly, the present techniques identify the same player across multiple frames by matching the same player in image patches, such as bounding boxes. Traditional Re-ID solutions rely on a unified global feature and inefficient local features. Generally, deep layers of a neural network are used to produce a global feature, while shallow layers produce local features. Traditional models generate features using deep layers which may be referred to as a unified global feature. As players wear similar jerseys and share similar backgrounds when within the area of play, global features are not capable of distinguishing different players since there is very little difference between their global features. In addition, global features are traditionally extracted from deeper layers of a convolution neural network. These deep layers mostly contain high level semantic information and easily fall into pairing errors. Moreover, traditional solutions obtain local features by dividing an image into several independent parts, and then summarizing the local features independently. Independent summarization of local features causes errors due to the lack of context when extracting local features. Additionally, extracting local features without any context will weaken the most discriminative part of the images when all parts' features are merged. A discriminative part of a feature or discriminative features are those features that are most likely or always different between persons within bounding boxes.

The lightweight multi-branch and multi-scale (LMBMS) re-identification according to the present techniques extracts global features and abundant multi-scale multi-level local features. In embodiments, an LMBMS model consists of three branches. Each branch starts from a different part of the backbone network. As described herein, the backbone network may be an 18-layer Residual Network (ResNet-18). After several refine blocks in each branch, the features are generated at different scales and different levels. After that, features from all branches are merged. Finally, a channel-wise attention mechanism is applied to select efficient features dynamically. Features from some channels with a high identification are strengthened, and features from other channels with low identification are weakened. Features with a high identification may be the most discriminative features. Accordingly, the present techniques can focus and use most the discriminative part of an image to distinguish and pair players. For example, two players on the same team may look the same, and the most discriminative part of features extracted from the two players will be the jersey number area. Put another way, the jersey number area will most likely or always be different between persons on the same team. The ability to strengthen and weaken particular channels may be learned from a dataset during training. The structure of the LMBMS Re-ID model is depicted in FIG. 4.

The diagram of FIG. 3 is not intended to indicate that the frames are limited to capturing a single player. Rather, the bounding boxes 300 are image patches derived from a frame, which can include multiple image patches or bounding boxes. The present techniques can be implemented using any number of bounding boxes not illustrated in FIG. 3.

Figure 4:
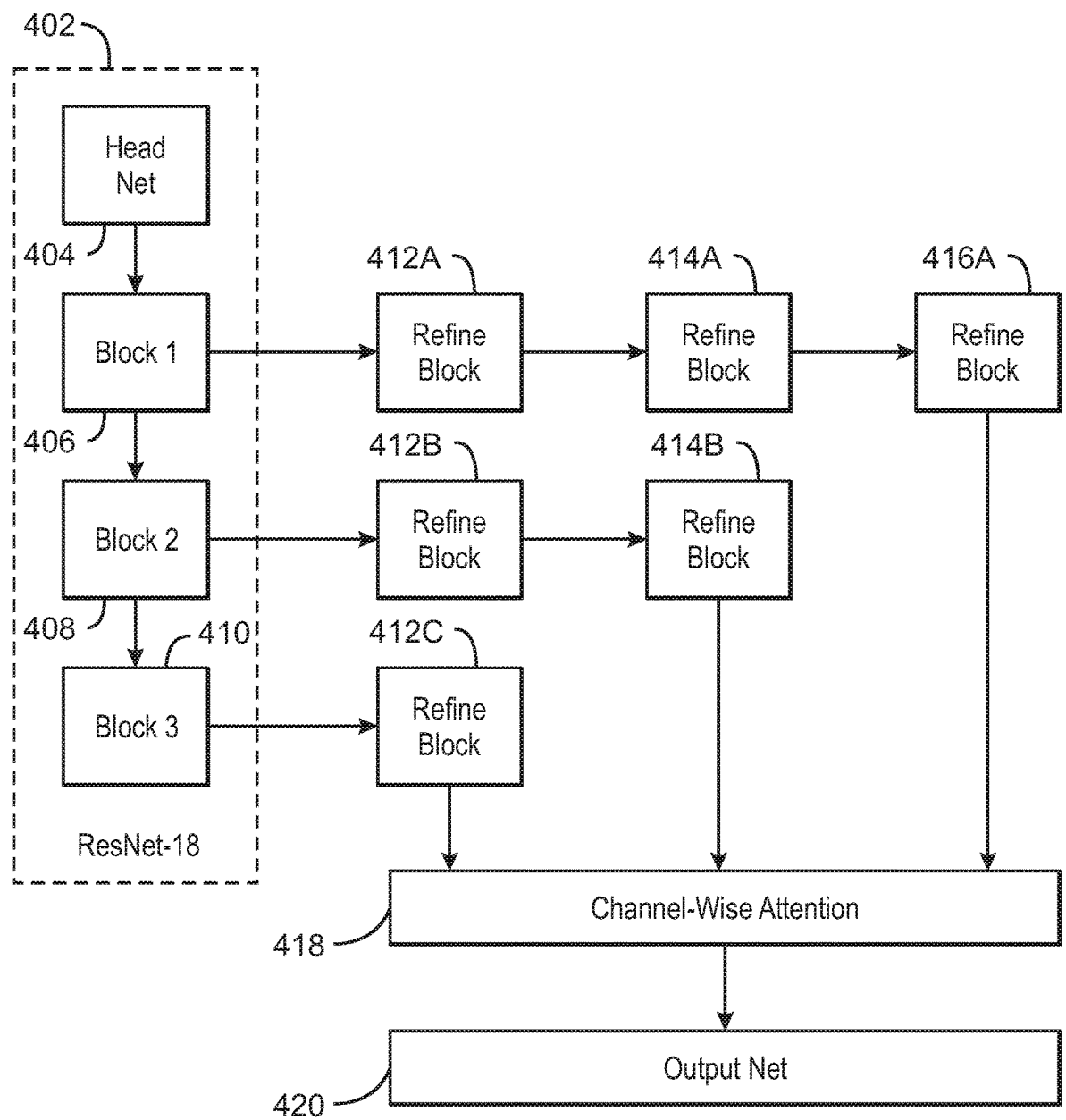
FIG. 4 is a block diagram of a structure of a lightweight multiple branch multiple scale model for re-identification.

FIG. 4 is a block diagram of a structure of a lightweight multiple branch multiple scale model 400 for re-identification. In embodiments, the lightweight multiple branch multiple scale model for re-identification is a neural network 402. The convolutional network backbone as described herein is an 18-layer Residual Network (ResNet-18). However, any classification model with good balance of performance and speed can be used. As shown in Table 1, ResNet-18 has 6 parts, different parts have different resolutions, different resolutions present features with different level (such as abstract and detail) and different scale, wherein the different scale may refer to various sizes of the image.

TABLE 1

| Head Net | conv(7*7*64, S2) |
|---|---|
|  | Max Pool(3*3, S2, P1) |
| Block 1 | conv(3*3*64)*4 |
| Block 2 | conv(3*3*128)*4 |
| Block 3 | conv(3*3*256)*4 |
| Block 4 | conv(3*3*512)*4 |
| FC | conv(1*1*1000) |

As indicated in Table 1, the portions of ResNet-18 used according to the present techniques include a head network (head net) and four residual blocks. Accordingly, for the head net 404, a 7×7 convolutional layer with 64 output channels and a stride of 2 is followed by a 3×3 maximum pooling layer with a stride of 2. Each residual block may have a number of convolutional layers as described with respect to FIG. 5. However, the residual blocks according to the present techniques include additional average pooling as described with respect to FIG. 5.

As defined in Table 1, residual block 1 includes a 3×3 convolutional layer with 64 output channels and a stride of 4. Residual block 2 includes a 3×3 convolutional layer with 128 output channels and a stride of 4. Residual block 3 includes a 3×3 convolutional layer with 256 output channels and a stride of 4. Residual block 4 includes a 3×3 convolutional layer with 512 output channels and a stride of 4. A fully connected layer flattens a 2D array into a 1D array and connects all input nodes and all output nodes.

The LMBMS Re-ID model 400 uses head net 404, residual block 1 406, residual block 2 408, and residual block 3 410 for extracting features.

In embodiments, each residual block forms the start of a branch of the LMBMS. Features extracted from each residual block may be input to a plurality of refine blocks. Thus, each branch of the LMBMS includes a residual block and one or more refine blocks. In embodiments, the number of refine blocks applied to features extracted from a residual block is dependent on a scale and resolution of the features. In particular, the number of refine blocks in each branch may be selected to guarantee that output of each branch has a same size. Since the output of each residual block may have different output sizes, the refine blocks can generate a same size output for each branch. As illustrated in FIG. 4, features extracted from the residual block 1 406 may be processed by refine blocks 412A, 414A, and 416A. Features extracted from the residual block 2 408 may be processed by refine blocks 412B and 414B. Features extracted from the residual block 3 410 may be processed by a refine block 412C. The refine blocks illustrated in FIG. 4 unify different levels of features into the same feature space. A channel-wise attention mechanism 418 receives and pools the feature maps from the refine blocks into feature map. The features may be reshaped and squeezes to a sequence. As used here, to squeeze to a sequence may refer to flattening a high-dimension array to a one-dimensional sequence. The output network 420 (output net) may then serve as an output layer that performs a 1×1 convolution.

The diagram of FIG. 4 is not intended to indicate that the example system is to include all of the blocks and modules shown in FIG. 4. Rather, the example system 400 can be implemented using fewer or additional blocks and modules not illustrated in FIG. 4.

Figure 5:
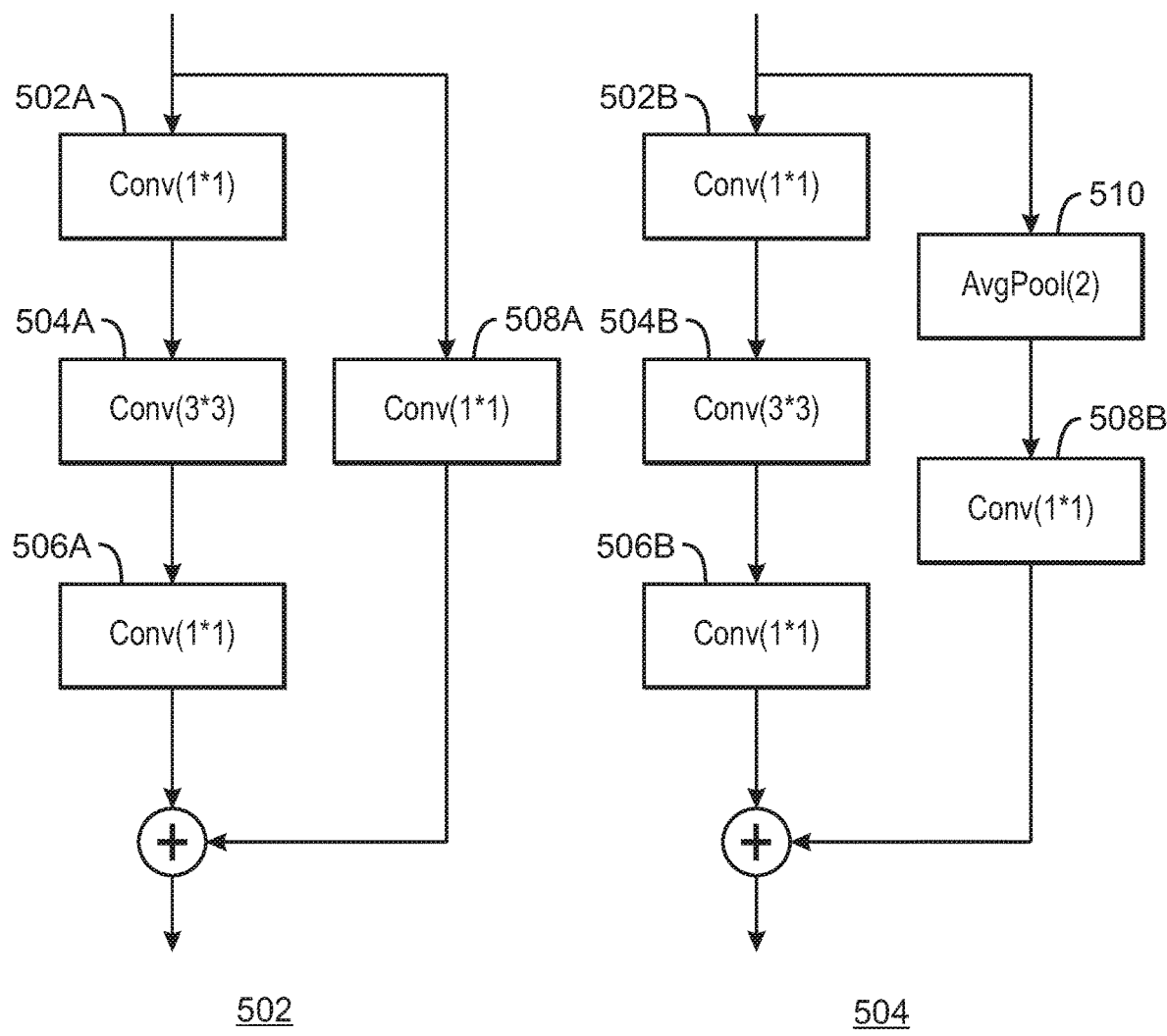
FIG. 5 is a block diagram of the structure of a bottleneck and a refine block.

FIG. 5 is a block diagram of the structure of a bottleneck 502 and a refine block 504. The traditional bottleneck 502 includes a layer 502A that performs a 1×1 convolution, a layer 504A that performs a 3×3 convolution, and a layer 506A that performs a second 1×1 convolution. In execution, the layer 502A and the layer 506A function to reduce and then restore dimensions, while the layer 504A creates a bottleneck with smaller input/output dimensions than the convolution performed. Accordingly, the bottleneck 502 reduces channels of the input before performing the computationally expensive 3×3 convolution and restores the channels back to the original shape using a 1×1 convolution. The skip branch of the traditional bottleneck 502 includes a layer 508A that performs a 1×1 convolution.

The refine block 504 includes a layer 502B that performs a 1×1 convolution, a layer 504B that performs a 3×3 convolution, and a layer 506B that performs a second 1×1 convolution. The refine block 504 also includes a layer 508B in a skip branch that performs a 1×1 convolution. Similar to the traditional bottleneck 502, the refine block 504 can receive any resolution input feature map, and generate new feature map that is half-sized in resolution and four times in number of channels. An additional average pooling layer 510 in the skip branch abstracts more general information to focus on important, discriminative areas of the input image. As illustrated in FIG. 4, there are different numbers of refine blocks stacked in each branch, which unifies different levels of features into the same feature space. In particular, different branches of the LMBMS may have different sizes and different resolution features, and are not in the same feature space. In order to maintain the characteristic features, each refine block may transfer features into a same feature space.

The diagram of FIG. 5 is not intended to indicate that the refine block 504 is to include all of the convolutions and pooling shown in FIG. 5. Rather, the example refine block 504 can be implemented using fewer or additional convolutional layers and pooling not illustrated in FIG. 5.

Figure 6:
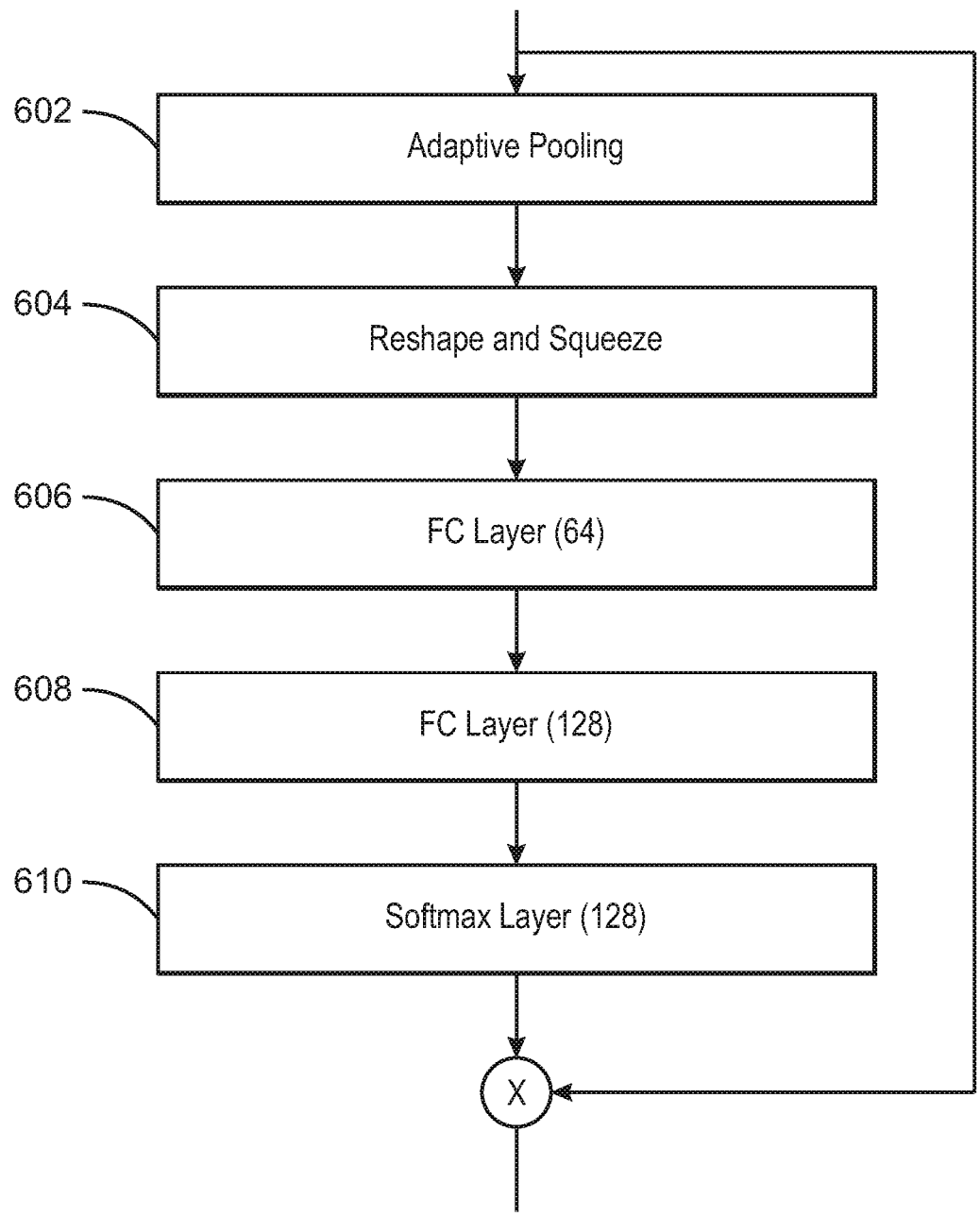
FIG. 6 is an illustration of a channel-wise attention mechanism.

FIG. 6 is an illustration of a channel-wise attention mechanism 600. When features from all branches are collected as illustrated in FIG. 4, a channel-wise attention mechanism is applied to the features to obtain a weight distribution for each feature. The channel-wise attention mechanism can generate features dynamically and has a more efficient feature expression. In the channel-wise attention mechanism 600, block 602 performs adaptive pooling. In adaptive pooling, two-dimensional (2D) feature maps are pooled into a single value. At block 604, the single feature map value is reshaped and squeezed into a sequence. Thus, a high dimension array may be converted into a one-dimension array. A layer 606 is a fully connected layer with 64 output channels. A layer 608 is a fully connected layer with 128 output channels.

After the two fully connected convolution layers 606 and 608, a 128-dimension vector is obtained, where each dimension represents an importance of each channel. To obtain weight of each channel, a softmax layer 610 is applied. The softmax function is applied as follows:

$$\text{softmax}(x^i) = \frac{e^{x^i}}{\sum_{j=0}^{k} e^{x^j}}$$

The softmax layer 610 produces a unified weight distribution. To obtain the final features, the weight distribution output of the softmax layer 610 is multiplied by the original features. In embodiments, Re-ID features are treated as a distance metric. When used in single-cam multiple player tracking and multi-cam association, the features should be normalized in unified space. In embodiments, batch normalization is added in final output.

The diagram of FIG. 6 is not intended to indicate that the channel-wise attention mechanism 600 is to include all of the convolutions and pooling shown in FIG. 6. Rather, the example the channel-wise attention mechanism 600 can be implemented using fewer or additional fully connected layers and pooling not illustrated in FIG. 6.

Figure 7:
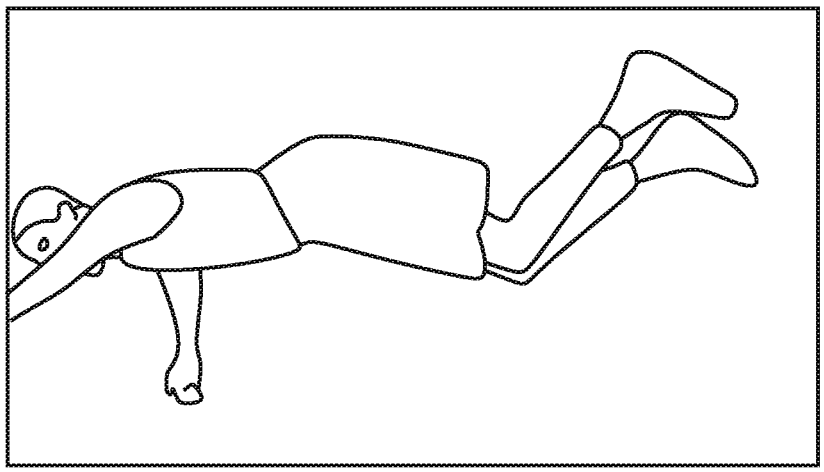
FIG. 7 is an illustration of players.
Figure 7:
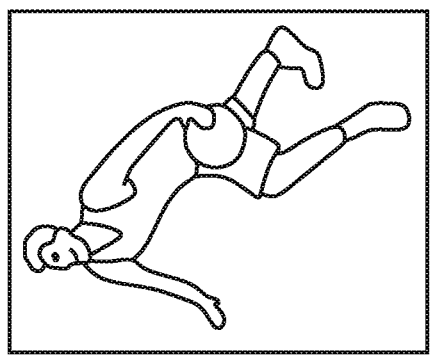
Figure 7:
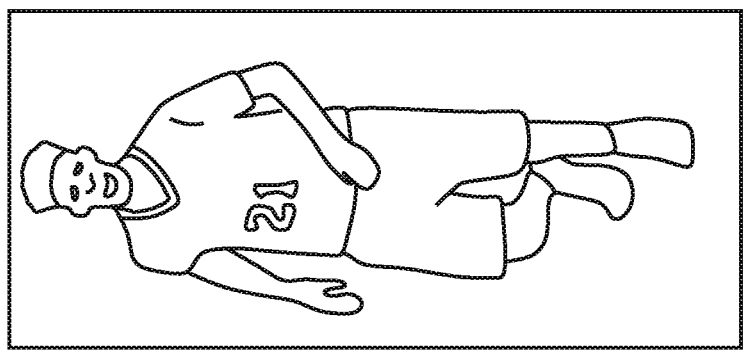
Figure 7:
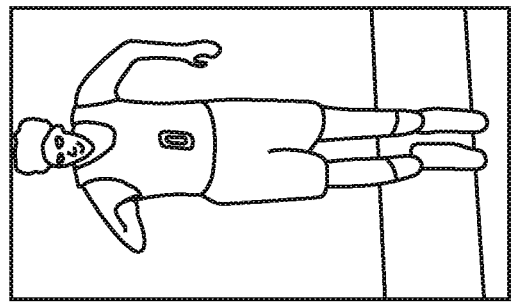

To evaluate LMBMS model in sport analysis, a dataset with 20000 images containing 100 players from 50+ basketball videos is used to train the model. FIG. 7 is an illustration 700 of players 702, 704, 706, and 708. Each of the players 702, 704, 706, and 708 have different sizes, poses, orientations and backgrounds. All in all, each player has 200 images from several camera angles in several sequences. 90% of data is used as the training set, and the rest 10% is the testing set.

During a training phase of the LMBMS model, training efficiency may be promoted as follows. First, in each epoch, some examples are selected with different difficulty, in detail. Hard examples are made of different players from same team, and easy examples are different players from different teams. Second, each image is assigned a fixed probability, and can simulate an occlusion situation where more than one player is in bounding box. Finally, considering features are used when making pairs, a triplet loss is combined for a metric task and cross entropy loss for classification task to guide training. The losses can obtain good classification results during training as well as generate an appropriate feature mapping function. Triplet loss and cross entropy loss are as follows:

$$\text{loss}_{triplet} = \sum_{i=0}^{N} \left[ \|f(x_i^a) - f(x_i^p)\|_2^2 - \|f(x_i^a) - f(x_i^n)\|_2^2 + \alpha \right]_+ \quad \text{Triplet Loss}$$

$$\text{loss}_{cross-entropy} = -\frac{1}{N} \sum_{i=0}^{N} \sum_{k=0}^{M} y_{ik} \log p_{ik} \quad \text{Cross Entropy Loss}$$

The final loss function is made of triplet loss, cross entropy loss and a constant weight, which balances the two types of loss:

$$\text{loss}_{LMBMS} = \text{loss}_{triplet} + \alpha \text{loss}_{cross-entropy} \quad \text{Loss function of LMBMS}$$

where α is 3 in the exemplary dataset.

The present techniques keep a good balance between accuracy and speed. High accuracy guarantees the model can obtain more accurate identification results in a challenging situation when compared to the traditional model. What's more, fewer parameters guarantees that the model can run in real time. Traditionally, person Re-ID focuses on separating different identity in the same class which is extended from the classification task. However, these traditional techniques are typically based on deeper layers of ResNet-50, which is a baseline in a classification task. The deeper layers of ResNet-50 have fewer local information, which is important when distinguishing people with almost the same appearance. Second, in traditional techniques with local information, the image is divided into parts to do multi-scale feature extraction. Traditional techniques cannot realize multi-scale fusion when they separate local information from similar backgrounds. Finally, traditional techniques do not have a good balance between performance and model complexity.

Figure 8:
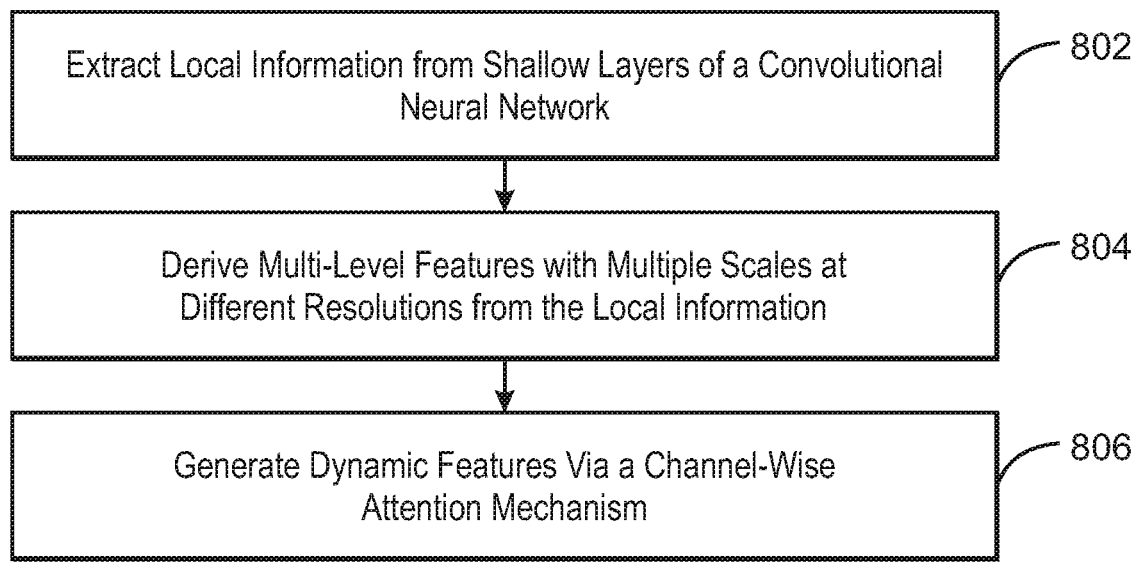
FIG. 8 is a process flow diagram of a method that enables lightweight multi-branch and multi-scale (LMBMS) re-identification.

FIG. 8 is a process flow diagram of a method 800 that enables lightweight multi-branch and multi-scale (LMBMS) re-identification. The example method 800 can be implemented in system 100 of FIG. 1, the computing device 900 of FIG. 9 or the computer readable media 1000 of FIG. 10. For example, the method 800 can be implemented using the single player tracking module 102, multi-view association module 104, processing unit CPU 902, GPU 908, or the processor 1002.

At block 802, local information is extracted from shallow layers of a convolutional neural network. The local information may be local features extracted from images input to a convolutional neural network, such as ResNet-18. The images input to the ResNet-18 may be isolated bounding boxes that define a location of each player in a single camera view captured by a camera of a plurality of cameras. The bounding box may be described by a location of the bounding box within the image according to xy coordinates. The width (w) and the height (h) of the bounding box is also given.

At block 804, multi-level features at multiple scales are derived at different resolutions from the extracted local information. In particular, local features extracted from residual block 1, residual block 2, and residual block 3 may be input into one or more refine blocks, wherein extraction of features from each residual block is the start of a branch in the LMBMS model. Features extracted from residual block 1 are processed through three refine blocks. In the ResNet-18, residual block 1 receives the output of the head net. Features extracted from residual block 2 are processed through two refine blocks. In the ResNet-18, residual block 2 receives the output of the residual block 1. Features extracted from residual block 3 are processed through one refine block. In the ResNet-18, residual block 3 receives the output of residual block 2. Accordingly, after several refine blocks in each branch, the features are generated at different scales and different levels.

At block 806, dynamic features are generated via a channel-wise attention mechanism. The channel-wise attention mechanism merges the features generated at different scales from each branch of the LMBMS model. In particular, efficient features are selected from the features generated at different scales and different levels. Features from some channels with high identification are strengthened, and features from other channels with low identification are weakened via a weight distribution derived for each feature. To obtain weight of each channel, a softmax function is applied. The softmax function produces a unified weight distribution. To obtain the final features, the weight distribution output of the softmax function is multiplied by the original features.

Once features are obtained, feature matching may be executed. In single camera Re-ID, feature matching occurs across pairs of frames from a single camera. In multiple-camera association, feature matching occurs across pairs of frames from different cameras of a camera system at timestamp t. In feature matching, a detected player in one frame is matched with the same player in other frames according to extracted features. In this manner, the Re-ID as described herein enables player identification even in extreme occlusions and other poor conditions.

This process flow diagram is not intended to indicate that the blocks of the example method 800 are to be executed in any particular order, or that all of the blocks are to be included in every case. Further, any number of additional blocks not shown may be included within the example method 800, depending on the details of the specific implementation.

Figure 9:
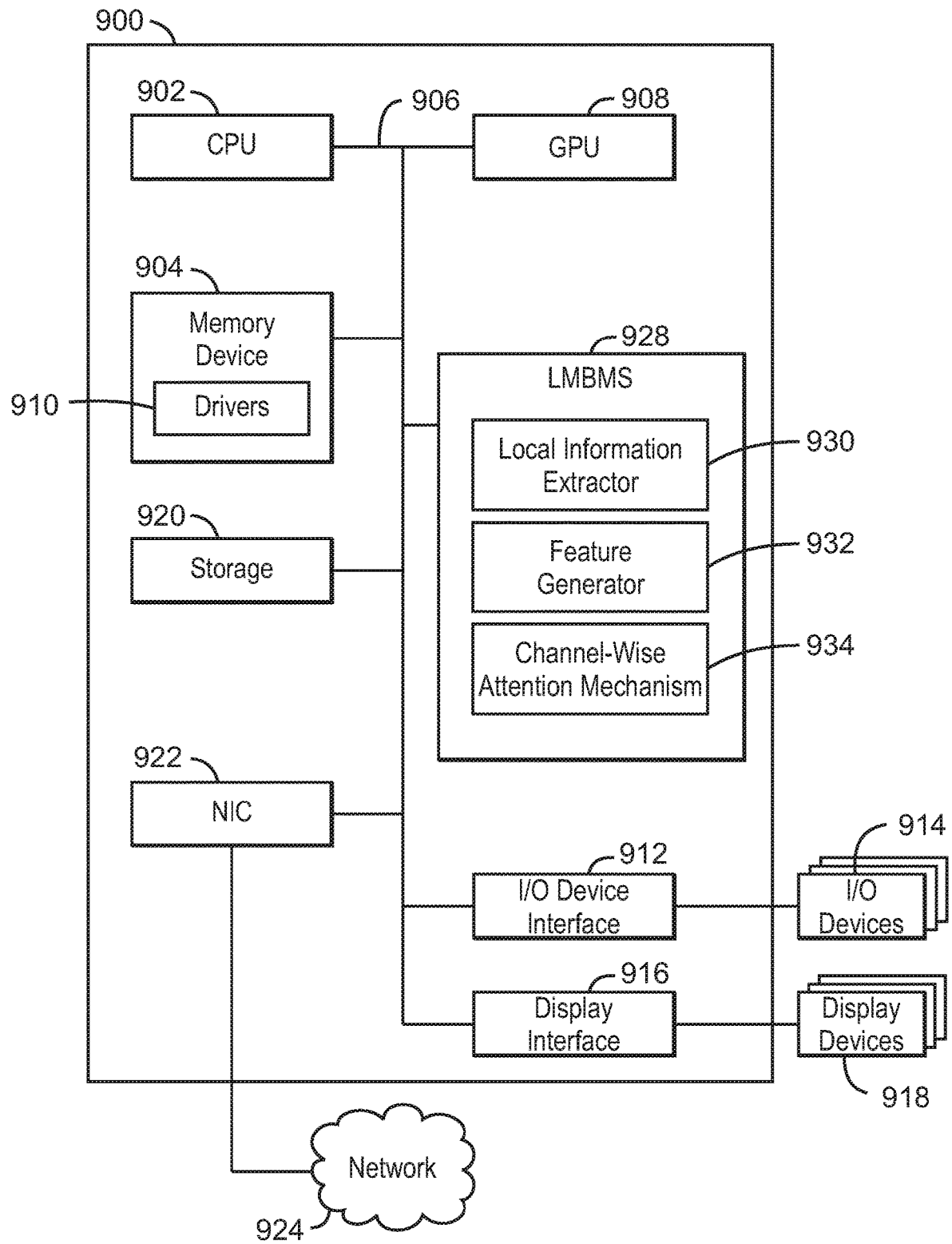
FIG. 9 is a block diagram illustrating a computing device that enables lightweight multi-branch and multi-scale re-identification.

Referring now to FIG. 9, a block diagram is shown illustrating a computing device that enables lightweight multi-branch and multi-scale (LMBMS) re-identification. The computing device 900 may be, for example, a laptop computer, desktop computer, tablet computer, mobile device, or wearable device, among others. The computing device 900 may include a central processing unit (CPU) 902 that is configured to execute stored instructions, as well as a memory device 904 that stores instructions that are executable by the CPU 902, the memory device 904 including drivers 910. The CPU 902 may be coupled to the memory device 904 by a bus 906. Additionally, the CPU 902 can be a single core processor, a multi-core processor, a computing cluster, or any number of other configurations. Furthermore, the computing device 900 may include more than one CPU 902. In some examples, the CPU 902 may be a system-on-chip (SoC) with a multi-core processor architecture. In some examples, the CPU 902 can be a specialized digital signal processor (DSP) used for image processing. The memory device 904 can include random access memory (RAM), read only memory (ROM), flash memory, or any other suitable memory systems. For example, the memory device 904 may include dynamic random-access memory (DRAM).

The computing device 900 may also include a vision processing unit or graphics processing unit (GPU) 908. As shown, the CPU 902 may be coupled through the bus 906 to the GPU 908. The GPU 908 may be configured to perform any number of graphics operations within the computing device 900. For example, the GPU 908 may be configured to render or manipulate graphics images, graphics frames, videos, or the like, to be displayed to a viewer of the computing device 900.

The CPU 902 may also be connected through the bus 906 to an input/output (I/O) device interface 912 configured to connect the computing device 900 to one or more I/O devices 914. The I/O devices 914 may include, for example, a keyboard and a pointing device, wherein the pointing device may include a touchpad or a touchscreen, among others. The I/O devices 914 may be built-in components of the computing device 900, or may be devices that are externally connected to the computing device 900. In some examples, the memory 904 may be communicatively coupled to I/O devices 914 through direct memory access (DMA).

The CPU 902 may also be linked through the bus 906 to a display interface 916 configured to connect the computing device 900 to a display device 916. The display devices 918 may include a display screen that is a built-in component of the computing device 900. The display devices 918 may also include a computer monitor, television, or projector, among others, that is internal to or externally connected to the computing device 900. The display device 916 may also include a head mounted display.

The computing device 900 also includes a storage device 920. The storage device 920 is a physical memory such as a hard drive, an optical drive, a thumbdrive, an array of drives, a solid-state drive, or any combinations thereof. The storage device 920 may also include remote storage drives.

The computing device 900 may also include a network interface controller (NIC) 922. The NIC 922 may be configured to connect the computing device 900 through the bus 906 to a network 924. The network 924 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 900 further includes a lightweight multi-branch and multi-scale (LMBMS) re-identification module 928 for person identification. A local information extractor 930 may be configured to extract global feature and abundant multi-scale multi-level local features from input images. Branches of the LMBMS Re-ID module 928 may extract local features from shallow layers of ResNet-18. A multi-scale, multi-level feature generator 932 applies one or more refine blocks to the extracted features. A channel-wise attention mechanism 934 generates dynamic features from the refined features. The channel-wise attention mechanism merges the features generated at different scales from each branch of the LMBMS model. Once features are obtained, feature matching may be executed. In single camera Re-ID, feature matching occurs across pairs of frames from a single camera. In multiple-camera, feature matching occurs across pairs of frames from different cameras of a camera system at timestamp t.

The block diagram of FIG. 9 is not intended to indicate that the computing device 900 is to include all of the components shown in FIG. 9. Rather, the computing device 900 can include fewer or additional components not illustrated in FIG. 9, such as additional buffers, additional processors, and the like. The computing device 900 may include any number of additional components not shown in FIG. 9, depending on the details of the specific implementation. Furthermore, any of the functionalities of the LMBMS Re-ID module 928, the multi-scale, multi-level feature generator 932, and the channel-wise attention mechanism 932 may be partially, or entirely, implemented in hardware and/or in the processor 902. For example, the functionality may be implemented with an application specific integrated circuit, in logic implemented in the processor 902, or in any other device. For example, the functionality of the LMBMS Re-ID module 928 may be implemented with an application specific integrated circuit, in logic implemented in a processor, in logic implemented in a specialized graphics processing unit such as the GPU 908, or in any other device.

Figure 10:
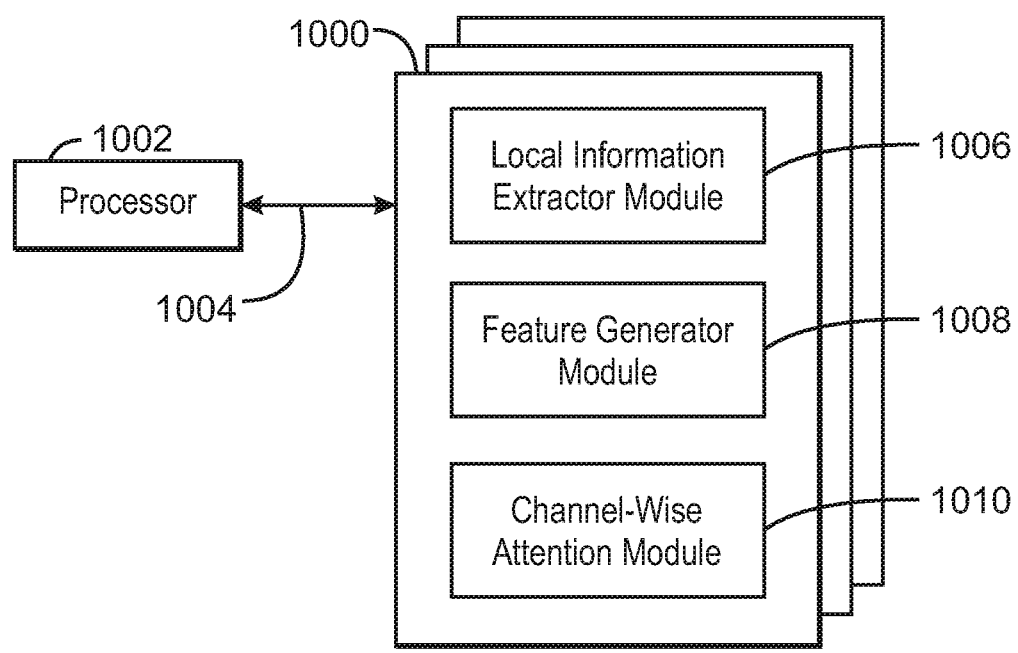
FIG. 10 is a block diagram showing computer readable media that stores code for enabling a lightweight multi-branch and multi-scale re-identification.

FIG. 10 is a block diagram showing computer readable media 1000 that stores code for enabling a lightweight multi-branch and multi-scale (LMBMS) re-identification. The computer readable media 1000 may be accessed by a processor 1002 over a computer bus 1004. Furthermore, the computer readable medium 1000 may include code configured to direct the processor 1002 to perform the methods described herein. In some embodiments, the computer readable media 1000 may be non-transitory computer readable media. In some examples, the computer readable media 1000 may be storage media.

The various software components discussed herein may be stored on one or more computer readable media 1000, as indicated in FIG. 10. For example, a local information extractor module 1006, a multi-scale, multi-level feature module 1008, and a channel-wise attention module 1010 may be stored on the computer readable media 1000.

The local information extractor module 1006 may be configured to extract global feature and abundant multi-scale multi-level local features from input images. The multi-scale, multi-level feature module 1008 may be configured to applies one or more refine blocks to the extracted features. The channel-wise attention module 1010 may be configured to extract a skeleton frame corresponding to the person within the workout area. The repetition counting module 1012 may be configured to generates dynamic features from the refined features.

The block diagram of FIG. 10 is not intended to indicate that the computer readable media 1000 is to include all of the components shown in FIG. 10. Further, the computer readable media 1000 may include any number of additional components not shown in FIG. 10, depending on the details of the specific implementation.

EXAMPLES

Example 1 is a system for lightweight multi-branch and multi-scale (LMBMS) re-identification. The system includes a convolutional neural network trained for person identification, wherein the convolutional neural network comprises a series of residual blocks that obtain input from a head network of the convolutional neural network; a plurality of refine blocks, wherein one or more refine blocks take as input features from a residual block of the series of residual blocks, wherein the features are at input at different scales and different resolutions and an output of the plurality of refine blocks is a plurality of features in a same feature space; and a channel-wise attention mechanism to merge the plurality of features and generate final dynamic features.

Example 2 includes the system of example 1, including or excluding optional features. In this example, feature matching is applied to the final dynamic features across pairs of frames from a single camera view for single camera person re-identification.

Example 3 includes the system of any one of examples 1 to 2, including or excluding optional features. In this example, feature matching is applied to the final dynamic features across pairs of frames, each from a different camera view at a timestamp t, multiple camera person re-identification.

Example 4 includes the system of any one of examples 1 to 3, including or excluding optional features. In this example, the system includes one or more cameras that capture a plurality of players within an area of play; and a person detector that derives isolated bounding boxes for each player within the area of play, wherein the isolated bounding boxes are input to the convolutional neural network for person identification.

Example 5 includes the system of any one of examples 1 to 4, including or excluding optional features. In this example, the series of residual blocks derives features from bounding boxes input to the series of residual blocks, wherein features from deeper residual blocks are at a higher scale and a higher resolution when compared to features from shallower residual blocks.

Example 6 includes the system of any one of examples 1 to 5, including or excluding optional features. In this example, each refine block performs a 1×1 convolution, a 3×3 convolution, and a second 1×1 convolution on input features and multiplies a result of this series of convolutions with a result of average pooling and another 1×1 convolution applied to the input features in a skip branch of the refine block.

Example 7 includes the system of any one of examples 1 to 6, including or excluding optional features. In this example, a number of refine blocks applied to features extracted from a residual block is dependent on a scale and resolution of the features.

Example 8 includes the system of any one of examples 1 to 7, including or excluding optional features. In this example, the channel-wise attention mechanism obtains a weight distribution for each feature according to a softmax function and merges features input to the channel-wise attention mechanism to obtain a 128-dimension vector of the final dynamic features, where each dimension represents an importance of each channel.

Example 9 includes the system of any one of examples 1 to 8, including or excluding optional features. In this example, batch normalization is applied to the final dynamic features.

Example 10 includes the system of any one of examples 1 to 9, including or excluding optional features. In this example, the convolutional neural network is trained using a triplet loss combined with a metric task and cross entropy loss for classification.

Example 11 is a method for lightweight multi-branch and multi-scale (LMBMS) re-identification. The method includes extracting local features from bounding boxes input to a convolutional neural network trained for person identification, wherein the convolutional neural network comprises a series of residual blocks that obtain input from a head network of the convolutional neural network; deriving multi-level features at multiple scales from the extracted local features via the series of residual blocks, wherein one or more refine blocks take as input features from each residual block of the series of residual blocks and outputs a plurality of features in a same feature space; and merging the plurality of features to generate final dynamic features.

Example 12 includes the method of example 11, including or excluding optional features. In this example, feature matching is applied to the final dynamic features across pairs of frames from a single camera view for single camera person re-identification.

Example 13 includes the method of any one of examples 11 to 12, including or excluding optional features. In this example, feature matching is applied to the final dynamic features across pairs of frames, each from a different camera view at a timestamp t, multiple camera person re-identification.

Example 14 includes the method of any one of examples 11 to 13, including or excluding optional features. In this example, the method includes capturing a plurality of players within an area of play; and deriving isolated bounding boxes for each player within the area of play, wherein the isolated bounding boxes are input to the convolutional neural network for person identification.

Example 15 includes the method of any one of examples 11 to 14, including or excluding optional features. In this example, the series of residual blocks derives features from bounding boxes input to the series of residual blocks, wherein features from deeper residual blocks are at a higher scale and a higher resolution when compared to features from shallower residual blocks.

Example 16 includes the method of any one of examples 11 to 15, including or excluding optional features. In this example, each refine block performs a 1×1 convolution, a 3×3 convolution, and a second 1×1 convolution on input features and multiplies a result of this series of convolutions with a result of average pooling and another 1×1 convolution applied to the input features in a skip branch of the refine block.

Example 17 includes the method of any one of examples 11 to 16, including or excluding optional features. In this example, a number of refine blocks applied to features extracted from a residual block is dependent on a scale and resolution of the features.

Example 18 includes the method of any one of examples 11 to 17, including or excluding optional features. In this example, the method includes obtaining a weight distribution for each feature according to a softmax function and merging features input to a channel-wise attention mechanism to obtain a 128-dimension vector of the dynamic features, where each dimension represents an importance of each channel.

Example 19 includes the method of any one of examples 11 to 18, including or excluding optional features. In this example, batch normalization is applied to the final, dynamic features.

Example 20 includes the method of any one of examples 11 to 19, including or excluding optional features. In this example, the convolutional neural network is trained using a triplet loss combined with a metric task and cross entropy loss for classification.

Example 21 is at least one computer readable medium that enables a smart gym having instructions stored therein that. The computer-readable medium includes instructions that direct the processor to extract local features from bounding boxes input to a convolutional neural network trained for person identification, wherein the convolutional neural network comprises a series of residual blocks that obtain input from a head network of the convolutional neural network; derive multi-level features at multiple scales from the extracted local features via the series of residual blocks, wherein one or more refine blocks take as input features from each residual block of the series of residual blocks and outputs a plurality of features in a same feature space; and merge the plurality of features to generate final dynamic features.

Example 22 includes the computer-readable medium of example 21, including or excluding optional features. In this example, feature matching is applied to the final dynamic features across pairs of frames from a single camera view for single camera person re-identification.

Example 23 includes the computer-readable medium of any one of examples 21 to 22, including or excluding optional features. In this example, feature matching is applied to the final dynamic features across pairs of frames, each from a different camera view at a timestamp t, multiple camera person re-identification.

Example 24 includes the computer-readable medium of any one of examples 21 to 23, including or excluding optional features. In this example, the computer-readable medium includes capturing a plurality of players within an area of play; and deriving isolated bounding boxes for each player within the area of play, wherein the isolated bounding boxes are input to the convolutional neural network for person identification.

Example 25 includes the computer-readable medium of any one of examples 21 to 24, including or excluding optional features. In this example, the series of residual blocks derives features from bounding boxes input to the series of residual blocks, wherein features from deeper residual blocks are at a higher scale and a higher resolution when compared to features from shallower residual blocks.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system comprising:
   interface circuitry;
   machine-readable instructions; and
   at least one processor circuit to be programmed by the machine-readable instructions to:
      extract, using a first residual block of a convolutional neural network, a first local feature of a subject from one or more images of the subject input to the convolutional neural network, the first local feature associated with a first resolution;
      extract, using a second residual block of the convolutional neural network, a second local feature of the subject from the one or more images, the second local feature associated with a second resolution, the second resolution different than the first resolution;
      process, using a first number of refine blocks, the first local feature to generate a refined first local feature, the first number of refine blocks selected based on the first resolution;
      process, using a second number of refine blocks, the second local feature to generate a refined second local feature, the second number of refine blocks selected based on the second resolution, the second number of refine blocks different than the first number of refine blocks;
      generate final dynamic features for the subject based on the refined first local feature and the refined second local feature;
      identify the subject in a first image and a second image using the final dynamic features, the first image different than the second image, the first image and the second image different from the one or more images of the subject input to the convolutional neural network; and
      output an indicator identifying the subject in the first image and an indicator identifying the subject in the second image.

2. The system of claim 1, wherein the subject is a first subject, the one or more images includes the first subject and at least one other subject, and one or more of the at least one processor circuit is to:
   derive isolated bounding boxes for each subject in the one or more images, wherein the isolated bounding boxes are input to the convolutional neural network.

3. The system of claim 1, wherein one or more of the at least one processor circuit is to:
   derive the first local feature from bounding boxes input to the first residual block,
   derive the second local feature based on an output of the first residual block, the second local feature associated with a higher resolution than the first local feature.

4. The system of claim 1, wherein the first number of refine blocks includes a first refine block and one or more of the at least one processor circuit is to cause the first refine block to perform a series of convolutions including a 1×1 convolution, a 3×3 convolution, and a second 1×1 convolution on the first local feature and multiply a result of the series of convolutions with a result of average pooling and another 1×1 convolution applied to the first local feature in a skip branch of the refine block.

5. The system of claim 1, wherein one or more of the at least one processor circuit is to:
   obtain a weight distribution for the refined first local feature and the refined second local feature according to a softmax function; and
   generate the final dynamic features based on the weight distribution, the refined first local feature, and the refined second local feature.

6. A method comprising:
   extracting, using a first residual block of a convolutional neural network and by at least one processor circuit programmed by at least one instruction, a first local feature of a subject from one or more images of the subject input to the convolutional neural network, the first local feature associated with a first resolution;
   extracting, using a second residual block of the convolutional neural network, a second local feature of the subject from the one or more images, the second local feature associated with a second resolution, the second resolution different than the first resolution;
   processing, using a first number of refine blocks, the first local feature to generate a refined first local feature, the first number of refine blocks selected based on the first resolution;
   processing, using a second number of refine blocks, the second local feature to generate a refined second local feature, the second number of refine blocks selected based on the second resolution, the second number of refine blocks different than the first number of refine blocks;
   generating final dynamic features for the subject based on the refined first local feature and the refined second local feature;
   identifying the subject in a first image and a second image using the final dynamic features, the first image different than the second image, the first image and the second image different from the one or more images of the subject input to the convolutional neural network; and outputting an indicator identifying the subject in the first image and an indicator identifying the subject in the second image.

7. The method of claim 6, wherein the first image and the second image correspond to frames from a single camera view.

8. The method of claim 6, wherein the first image is associated with a first camera view and the second image is associated with a second camera view, the first camera view different than the second camera view.

9. The method of claim 6, wherein the subject is a first subject, the one or more images includes the first subject and at least one other subject, and further including:
deriving isolated bounding boxes for each subject in the one or more images, wherein the isolated bounding boxes are input to the convolutional neural network.

10. The method of claim 6, further including:
deriving the first local feature from bounding boxes input to the first residual block; and
deriving the second local feature based on an output of the first residual block, the second local feature associated with a higher resolution than the first local feature.

11. The method of claim 6, wherein the first number of refine blocks includes a first refine block and further including causing the first refine block to perform a series of convolutions including a 1×1 convolution, a 3×3 convolution, and a second 1×1 convolution on the first local feature and multiplying a result of this series of convolutions with a result of average pooling and another 1×1 convolution applied to the first local feature in a skip branch of the refine block.

12. The method of claim 6, further including:
selecting the first number of refine blocks for the first local feature based on a scale of associated with the first local feature; and
selecting the second number of refine blocks for the second local feature based on a scale associated with the second local feature.

13. The method of claim 6, further including:
obtaining a weight distribution for the refined first local feature and the refined second local feature according to a softmax function; and
generating the final dynamic features based on the weight distribution, the refined first local feature, and the refined second local feature.

14. The method of claim 6, further including applying batch normalization to the final dynamic features.

15. The method of claim 6, further including training the convolutional neural network using a triplet loss combined with a metric task and a cross entropy loss for classification.

16. At least one non-transitory machine-readable medium comprising machine-readable instructions to cause at least one processor circuit to at least:

extract, using a first residual block of a convolutional neural network, a first local feature of a subject from one or more images of the subject input to the convolutional neural network, the first local feature associated with a first resolution;

extract, using a second residual block of the convolutional neural network, a second local feature of the subject from the one or more images, the second local feature associated with a second resolution, the second resolution different than the first resolution;

process, using a first number of refine blocks, the first local feature to generate a refined first local feature, the first number of refine blocks selected based on the first resolution;

process, using a second number of refine blocks, the second local feature to generate a refined second local feature, the second number of refine blocks selected based on the second resolution, the second number of refine blocks different than the first number of refine blocks;

generate final dynamic features for the subject based on the refined first local feature and the refined second local feature;

identify the subject in a first image and a second image using the final dynamic features, the first image different than the second image, the first image and the second image different from the one or more images of the subject input to the convolutional neural network; and output an indicator identifying the subject in the first image and an indicator identifying the subject in the second image.

17. The at least one non-transitory machine-readable medium of claim 16, wherein the first image and the second image correspond to frames from a single camera view.

18. The at least one non-transitory machine-readable medium of claim 16, wherein the first image is associated with a first camera view and the second image is associated with a second camera view, the first camera view different than the second camera view.

19. The at least one non-transitory machine-readable medium of claim 16, wherein the subject is a first subject, the one or more images includes the first subject and at least one other subject, and the machine-readable instructions are to cause one or more of the at least one processor circuit to:
derive isolated bounding boxes for each subject in the one or more images, wherein the isolated bounding boxes are input to the convolutional neural network.

20. The at least one non-transitory machine-readable medium of claim 16, wherein the machine-readable instructions are to cause one or more of the at least one processor circuit to:
derive the first local feature from bounding boxes input to the first residual block; and
derive the second local feature based on an output of the first residual block, the second local feature associated with a higher resolution than the first local feature.

* * * * *